…

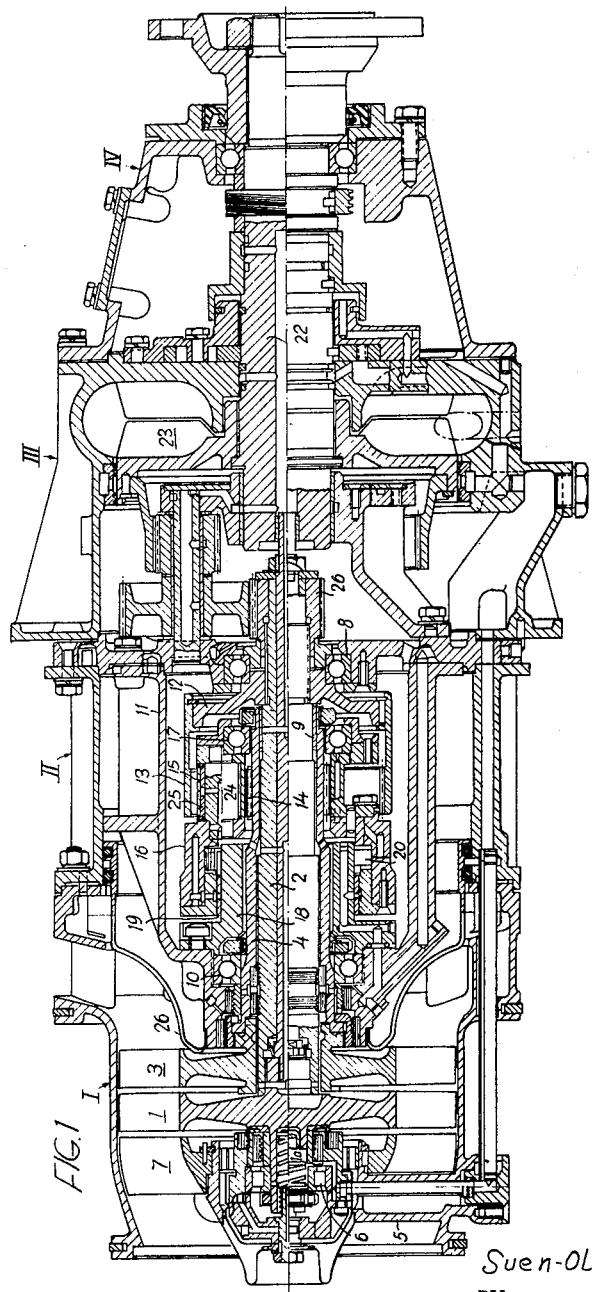

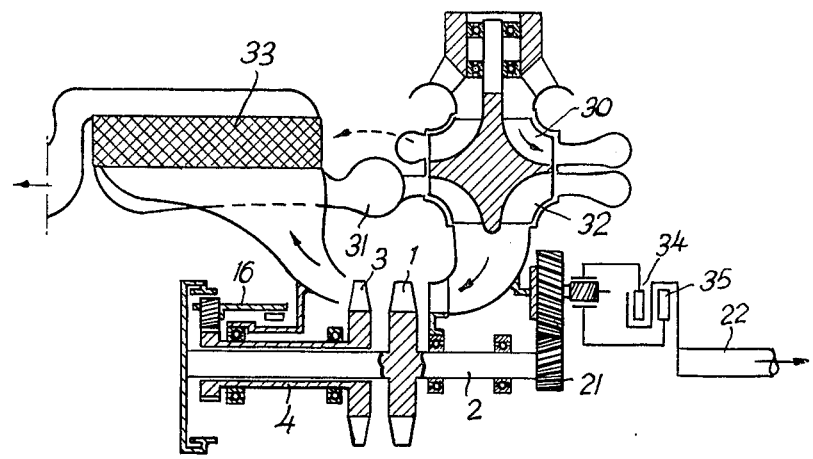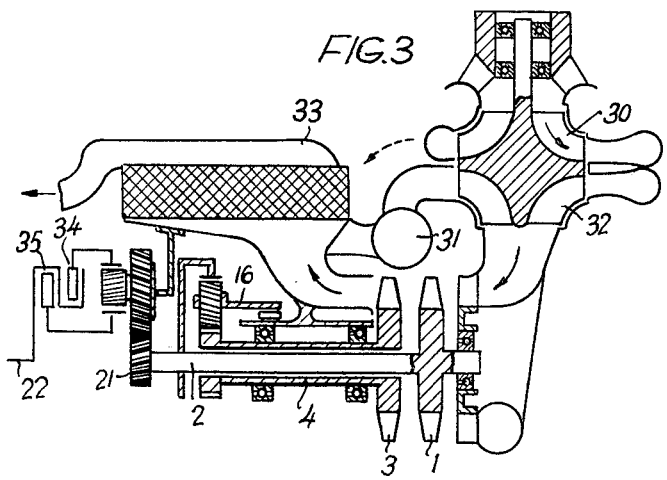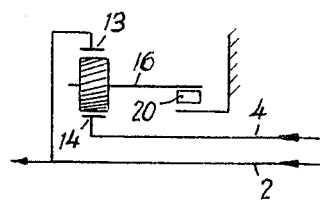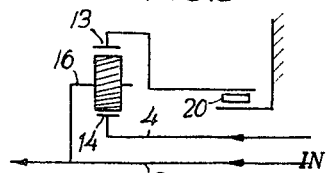

United States Patent Office 3,207,003
Patented Sept. 21, 1965

3,207,003
GAS TURBINE POWER PLANT
Sven-Olof Kronogård, Goteborg, Sweden, assignor to Ab Volvo, Goteborg, Sweden, a corporation of Sweden
Filed Aug. 16, 1962, Ser. No. 217,394
Claims priority, application Sweden, Aug. 17, 1961, 8,314/61
5 Claims. (Cl. 74—677)

This invention relates to a gas turbine power plant comprising a gas producer and a useful power turbine which is mechanically independent of the gas producer, that is, consists of a so-called free-turbine.

The invention relates to a plant of the kind referred to and comprises two turbine stages which are interconnected by means of a toothed gearing. In its broadest aspect, the invention is characterized in that the toothed gearing is in the form of a three-element planetary gear, two of said elements being connected each with its turbine stage and the third element being a reactor element one of the turbine shafts being an output shaft, and a free-wheel device being inserted between the reactor element and the fixed support thereof. In this manner the two turbine stages will cooperate with each other such that during a first stage of operation both turbines will transmit power to the output shaft of the plane, whereas during the second stage of operation one of the turbine stages will be automatically disengaged and rotate without transmitting power.

Gas turbine engines generally rotate at high speeds, such as up to 50,000 r.p.m., and these high speeds make very great demands upon the change speed gears which are required to reduce the speed to values suitable for automotive purposes. The problems involved in a simple reduction gear can be considered solved, but since in the operation of motor vehicles a variable gear device is desired, difficult additional problems are involved. If a purely mechanical gear box of conventional type is used in motor vehicles the change from one gear to another one results in shock-like jerks during engagement of the other gear because of the inertia of the turbine rotating at high speeds. In order to avoid such jerks there are required complicated synchronizing devices which are subjected to high stresses and, besides, changing of gears requires a certain time necessary for the operation of the synchronizing devices.

Another possibility consists in the combination of a gas turbine power plant with a hydro-dynamic torque converter. This combination simplifies the problems to a certain extent, but the torque converter is an expensive additional structure and reduces the overall efficiency of the plant. Further, the torque converter usually has to be combined with a mechanical gear, such as a planetary gear, the operation of which requires a preferably automatic control device which further complicates the plant and increases the cost thereof.

In accordance with the invention there is provided a free-turbine having two turbine stages cooperating with each other through a toothed gearing, resulting in the possibility of using one or both turbine stages so as to obtain two different conditions of operation corresponding to two different gear ratios. The object of the invention is to provide a system by means of which the change from one condition of operation to the other one is effected automatically with the intermediary of simple members. Assuming that during a first stage of operation both turbine stages act to drive the output shaft of the plant and that one turbine stage at a certain speed because of the state of flow no longer is able to contribute to the torque transmission, this turbine stage has to be disengaged from the output shaft. In this case, a clutch device for disengaging one turbine stage from the other one must be provided between the shafts of the two turbine stages. The most simple form of such a disengaging device is a free-wheel device which is able to operate quite satisfactorily at moderate speeds. In case of gas turbines rotating at extremely high speeds there arise complications because of the centrifugal forces acting upon the locking members of the free-wheel device. To my knowledge there is at present no free-wheel device in the market which in a satisfactory and reliable manner is able to engage and disengage two shafts rotating at speeds common in gas turbine operation. Conventional free-wheel devices, for example of the sprag type, comprise spring-loaded locking members. However, these free-wheel devices are constructed such that the centrifugal force during rotation of the device tends to disengage the locking members from the inner race. Consequently, the locking members have to be loaded by very strong springs so as to be kept in contact with their races even in high-speed operation, resulting in abnormally high surface pressures during certain conditions of operation and unsatisfactory pressures during other conditions of operation. For this reason such a free-wheel device is unsatisfactory if used in this manner. Even other known types of free-wheel devices are not satisfactory.

Due to the fact that in accordance with the present invention the free-wheel device is inserted between the reactor element and the fixed support thereof, the advantage is obtained that the free-wheel device will become operative as soon as the movement of reaction passes the zero value. During start, both turbine stages are rotating and transmitting torque, the force of reaction being taken by the free-wheel device. Since one turbine stage at increased vehicle speed because of the state of flow delivers a decreasing torque and at a certain speed no longer is able to transmit a driving torque, the force of reaction acting on the free-wheel device is simultaneously reduced and eventually drops to zero whereupon the free-wheel device disengages the inoperative turbine stage which then can rotate freely without torque transmission. Consequently, the change between the two stages of operation of the gas turbine engine is effected by the free-wheel device at a moment when both races of the free-wheel device are at rest. For this reason, no special demands have to be made upon the free-wheel device.

The invention will be described more closely hereinbelow with reference to embodiments thereof illustrated in the annexed drawing. FIG. 1 is a longitudinal sectional view of the useful power turbine of a gas turbine plant with appertaining mechanical gearing. FIGS. 2 and 3 are diagrammatic sectional views of two different embodiments of a gas turbine plant according to the invention and FIGS. 4 and 5 illustrate two different arrangements of a planetary gearing comprised in the plant.

The system illustrated in FIG. 1 is adapted to be connected to a gas producer, not shown, comprising a compressor, a combustion chamber and a turbine. The system illustrated is composed of four sections provided one behind the other and bolted to each other, namely, a turbine section I, a planetary gear section II, a reducing gear section III and a bearing section IV.

The turbine section comprises a first turbine stage 1, the rotor disc of which is carried by a tubular shaft 2, and a second turbine stage 3, the rotor disc of which is carried by another tubular shaft 4. The rotor disc of the turbine stage 1 has a tubular neck 1a which projects into a conical supporting element carried by spokes 5 and mounted in the turbine inlet in a roller bearing 6. The supporting element carries a rim of guide vanes 7.

The two turbine shafts 2 and 4 project into the planetary gearing section II where the end of the shaft 2 is mounted in a ball bearing 8 provided in a fixed intermediary wall. The free end of the shaft 4 is mounted on the shaft 2 by means of a journal bearing bushing 9. Comparatively close to its rotor disc the shaft 4 is mounted in a ball bearing 10 provided in a casing 11 which is bolted to the intermediary wall that carries the ball bearing 8.

Keyed to the shaft 2 is a disc 12 which carries a drum 13 having internal teeth and forming a ring gear. The shaft 4 has teeth forming a sun gear 14.

Between the ring gear 13 and the sun gear 14 there are provided planet gears 15 which are mounted on fixed shafts in a planet carrier 16. At one end the planet carrier is mounted on the shaft 4 by means of a ball bearing 17 provided radially outside the journal bearing 9, and the other end of the planet carrier is mounted on a collar 18 carried by the casing 11 and by means of a journal bearing 19.

Provided between the planet carrier 16 and the stationary collar 18 is a free-wheel device 20 of the sprag type comprising inclined and spring-actuated locking members arranged between coaxial races.

The shaft 2 of the first turbine 1 is the output shaft of the system and carries at its free end a pinion 21 which forms part of a reduction gear and from which the torque is transmitted to a shaft 22 forming the power take-off of the system. Numeral 23 denotes a hydraulic brake.

During start the two turbines 1 and 3 rotate in opposite directions and the torque is transmitted from the turbine 3 by the sun gear 14 and the planet gears 15 to the ring gear 13 and the shaft 2. At this time, the planet carrier 16 is stationary and the forces of reaction are taken by the free-wheel device 20.

As the speed of the first turbine 1 increases the torque produced by the other turbine 3 decreases and eventually drops to zero whereupon the speed of the turbine 3 is reduced and the turbine thereafter is likely to tend to rotate in the same direction as the turbine 1. Just as the zero value is passed, the free-wheel device 20 is disengaged whereupon the other turbine 3 is free to idle in the gas stream behind the first turbine 1 without absorbing any torque, and at the same time the planet carrier 16 begins to rotate in the same direction as the first turbine 1. As mentioned above, the speed of the second turbine 3 may decrease to zero and the turbine may begin to rotate in the same direction as the turbine 1.

From the above it will be apparent that during a first stage of operation the turbine set will operate as a counter-rotation turbine with a high torque multiplication and then smoothly and successively change to operate as a unidirectional turbine during a second stage of operation. Upon increasing load and decreasing of the speed of the first turbine 1 a corresponding smooth and successive change to the first stage of operation with counter-rotating turbine stages is obtained. It should be noted that the changes occur entirely automatically and without jerks due to the effect that the free-wheel device 20 is switched over a stationary and unloaded condition.

Since the speed of the turbines may amount to 50,000 r.p.m. or even more, it will be obvious that during the second stage of operation the speed of the planet carrier 16 may be of the same order. The locking members, springs and cages of the free-wheel device 20 are carried along during rotation of the planet carrier, and at a certain speed, for example 1,000 r.p.m. the locking members are disengaged from the fixed inner race, resulting in elimination of friction between these parts at high speeds.

Each planetary gear shaft 24 has a thick intermediate part and reduced necks projecting into the planet carrier 16. The right-hand neck, as viewed in the drawing, has a recess the shape of which corresponds to the outer race of the ball bearing 17. Consequently, the shaft 24 is prevented from turning in the planet carrier 16.

During the first stage of operation of the system, the planet carrier 16 is at rest and the speed of the planet gears 15 may amount to approximately 100,000 r.p.m. During this stage of operation the load on the planet gears is comparatively low for which reasons the high speeds will not give rise to noticeable problems as regards the bearing members. However, during the second stage of operation with the planet carrier 16 rotating at a speed of, for instance, 50,000 r.p.m., the bearings of the planet gears are additionally loaded by the centrifugal force acting on the gears. As compared with, for example, a planetary gearing which is connected to a hydrodynamic torque converter and in which the speed of the planet carrier possibly may amount to about 5,000 r.p.m., the load on the bearings of the planet gears is about a hundred times greater assuming other factors to be constant. In view thereof, the planetary gearing according to the invention is designed in a special manner.

Above all, the planet gears are very thin and their teeth are of comparatively small height. Accordingly, the planet gears have a shell-like core the thickness of which corresponds substantially to the height of the teeth, but may amount to 80 to 130% of the height. Due to this construction the planet gears are comparatively light even if they are in the usual manner made of steel. In order to further reduce the weight, the planet gears are preferably made of a suitable alloy which is considerably lighter than steel, such as certain titanium alloys. Favourable results have been obtained with an alloy comprising 6% aluminium, 40% vanadium and with the balance titanium. This alloy has a strength comparable with steel and can be given the same hardness by nitrogen case hardening.

The planet gears 15 are mounted on the thick shafts 24 by means of a journal bearing bushing 25 which may be pressed onto the shaft 24. In this case it does not contribute to the load on the bearing. This would be the case if the bushing 25 instead thereof were pressed into the planet gear 15. The bushing 25 may even be floating so as to rotate between the gear 15 and the shaft 24 in which case the sliding speed is reduced by one half due to the division into two sliding surfaces, thus reducing the bearing difficulties even if the bushing loads the bearing during rotation of the planet carrier 16.

In view of the high speeds, the planetary gearing must be constructed with high precision and tested prior to the assembly of the system for balancing and other purposes. As will be seen from the drawing, the planetary gearing together with the casing 11 and the intermediate wall carrying the casing, is in the form of a separate unit which in the assembled state easily can be tested prior to its insertion into the system.

One of the limiting walls at the turbine outlet is in the form of a double-walled conical plate 26. Cooling air flows through the space around the casing 11 and also through the space between the two walls of the conical plate 26. Part of the air is discharged at the apex of the cone and then flows along the outside of the cone toward the gas outlet. Cooling air is also conducted along other ways through the planetary gearing, and, in addition, serves as blocking air to prevent oil from escaping and gases from entering. The gearing is further cooled by lubrication oil which enters centrally and is forced outwards through the various shafts and bearings, inter alia under the action of the centrifugal force. The conical supporting member at the turbine inlet is also cooled and lubricated, cooling air being supplied and lubrication oil being supplied and discharged through ducts provided in the spokes 5. The lubrication oil circulates in a closed circuit comprising a cooler, and oil is supplied inter alia by a pump provided in the end section IV. The cooling and blocking air is drawn from the compressor of the gas producer, which is provided with a lubrication pump communicating with the common lubrication system.

The diagrammatic FIGS. 2 and 3 illustrate more complete plants. The gas producer consists of a compressor 30, a combustion chamber 31 and a turbine 32 which drives the compressor. There is also provided a regenerator 33 in which the residual heat of the exhaust gases from the useful power turbine is used for preheating the combustion air. While the two embodiments are generally of similar constructions, the planetary gearing section according to FIG. 2 is located on one side of the turbine 1, 3 and the reduction gearing and power take-off are located on the opposite side. In this respect, the plant according to FIG. 3 is more similar to the embodiment illustrated in FIG. 1. In FIG. 2 as well as in FIG. 3 the reduction gearing is combined with a planetary gearing and two alternatingly engageable clutches 34 and 35 for reversing the direction of rotation of the power take-off shaft 22.

In all of the three embodiments described above, it is assumed that the two turbine stages 1 and 3 are rotating in opposite directions during the first stage of operation. In this case the planet carrier 16 of the planetary gearing must constitute the reactor element, and one of the turbine stages is connected with the ring gear and the other one with the sun gear, as diagrammatically illustrated in FIG. 4. If, in contrast thereto, both turbine stages are rotating in the same direction during the first stage of operation, either the ring gear or the sun gear must constitute the reactor element of the planetary gear, whereas the two turbine stages are connected with the other elements of the planetary gearing as is shown in FIG. 5.

Due to the effect that one turbine stage of the power turbine is automatically and gradually disengaged and engaged in response to the conditions of operation, the power turbine will adapt itself to the load and speed in a very favourable manner. This effect can be further improved within a larger range of operation by the provision of adjustable inlet guide vanes at the radial inlet of the compressor 30 and/or at the inlet of the power turbine. In the last-named case the turbine inlet is formed with concentric spherical boundary surfaces, and the axis of the guide vanes extends through this center of the spheres. The guide vanes may be mechanically connected with the power control of the gas turbine plant or operated by means of a servo motor which is suitably controlled in response to the pressure conditions of the system or in response to variations in temperature.

What is claimed is:

1. A gas turbine power plant comprising a free useful power turbine comprising two turbine stages arranged to rotate in opposite directions and a stator element ahead of said turbine stages, said turbine stages being interconnected by means of a single toothed gearing in the form of a three-element planetary gear, two of said gear elements being connected each with its turbine stage and a third gear element, the planetary wheel carrier being a reactor element, one of the turbine shafts being an output shaft, and a free-wheel device inserted between said reactor element and a fixed support thereof, the fixed part of said free-wheel device being constituted by the inner race of said free-wheel device.

2. A gas turbine plant as claimed in claim 1, wherein the locking members of the free-wheel device are spring-loaded in a manner such as to be disengaged from the inner race at a speed of the outer race which is a fraction of the maximum speed of the last-named race.

3. A gas turbine plant as claimed in claim 1, wherein the planet gears of the planetary gear are formed with a shell-like core having a thickness which substantially corresponds to 80 to 130% of the height of the teeth.

4. A gas turbine plant as claimed in claim 3, wherein the planet gears are made from a material having a considerable lower specific weight than steel, such as from a titanium-vandium-aluminum alloy.

5. A gas turbine plant, as claimed in claim 4, wherein the material of the planet gears is an alloy comprising approximately 6% aluminium, 40% vandium and with the balance titanium.

References Cited by the Examiner

UNITED STATES PATENTS

| | | | |
|---|---|---|---|
| 2,023,584 | 12/35 | Harvey | 74—332 |
| 2,759,376 | 8/56 | Chamberlin et al. | 74—801 |
| 2,836,514 | 5/58 | Munster et al. | 74—434 |
| 2,852,912 | 9/58 | Kelley | 74—677 X |
| 2,883,885 | 4/59 | Upton | 74—801 |
| 2,905,025 | 9/59 | Karlsson et al. | 74—677 |
| 2,968,922 | 1/61 | Gilbert | 74—801 |
| 3,005,359 | 10/61 | Ahlen | 74—677 |
| 3,021,727 | 2/62 | Kelley et al. | 74—677 |
| 3,038,307 | 6/62 | Oprecht | 74—675 X |
| 3,049,945 | 8/62 | Lindsay | 74—677 X |
| 3,073,182 | 1/63 | Harmon | 74—677 |

DON A. WAITE, *Primary Examiner.*